United States Patent [19]

Sata

[11] Patent Number: 5,375,323
[45] Date of Patent: Dec. 27, 1994

[54] METHOD FOR SECURING SHAFT OF CAM FOLLOWER DEVICE FOR VALVE ACTION MECHANISM

[75] Inventor: Jiro Sata, Fujisawa, Japan

[73] Assignee: NSK Ltd., Tokyo, Japan

[21] Appl. No.: 125,347

[22] Filed: Sep. 22, 1993

Related U.S. Application Data

[63] Continuation of Ser. No. 785,317, Oct. 30, 1991, abandoned.

[51] Int. Cl.⁵ .............................................. B23P 15/00
[52] U.S. Cl. ..................................... 29/888.1; 29/507; 29/512; 74/569
[58] Field of Search ................. 29/888.1, 888.01, 507, 29/512; 74/569

[56] References Cited

U.S. PATENT DOCUMENTS

| | | | |
|---|---|---|---|
| 2,014,612 | 9/1935 | Burton | 29/888.1 |
| 2,276,301 | 3/1942 | Gregory . | |
| 2,291,564 | 7/1942 | Scott | 29/888.1 |
| 3,415,580 | 12/1968 | Malmsten | 29/512 |
| 4,221,041 | 9/1980 | Hufragl et al. | 29/512 |
| 4,969,261 | 11/1990 | Igarashi . | |
| 4,985,979 | 1/1991 | Speakman | 29/512 |

FOREIGN PATENT DOCUMENTS

| | | | |
|---|---|---|---|
| 2442696 | 8/1980 | France | 29/512 |
| 53211520 | 9/1932 | Japan . | |
| 5426403 | 3/1942 | Japan . | |
| 52-123328 | 10/1977 | Japan . | |
| 54-21556 | 7/1979 | Japan . | |
| 55-126115 | 9/1980 | Japan . | |
| 6032534 | 2/1982 | Japan . | |
| 587160 | 2/1983 | Japan . | |
| 60-88016 | 6/1985 | Japan . | |
| 62-7908 | 1/1987 | Japan . | |
| 63-75659 | 5/1988 | Japan . | |
| 63-133851 | 9/1988 | Japan . | |
| 6420935 | 2/1989 | Japan . | |
| 166704 | 12/1989 | Japan . | |
| H264704 | 2/1990 | Japan . | |
| H285804 | 7/1990 | Japan . | |

*Primary Examiner*—Irene Cuda
*Attorney, Agent, or Firm*—Helfgott & Karas

[57] ABSTRACT

A method of securing a shaft of a cam follower device for a valve action mechanism is provided such that after both ends of the shaft are engaged in an interference relationship in the through-holes which are formed in alignment in a pair of separated support walls provided opposing the cam to receive the action of a cam, the diameter at both ends of the shaft is expanded and the opposite ends of the shaft are caulked or crimped at the inner peripheral surface of the through-holes, and then both ends of the shaft are further expanded throughout the entire periphery thereof and inset or wedged into the inner peripheral surface of the through-holes.

4 Claims, 7 Drawing Sheets

METHOD FOR SECURING SHAFT OF CAM FOLLOWER DEVICE FOR VALVE ACTION MECHANISM

This is a continuation of application Ser. No. 785,317, filed Oct. 30, 1991, now abandoned.

BACKGROUND OF THE INVENTION

1. Field of the Invention

The present invention relates to a cam follower device incorporated into a valve action mechanism of an automobile engine for minimizing the wear on the parts of the valve action mechanism for a reduction in the noise level of the engine and a reduction in fuel consumption in the engine, specifically to a method and apparatus for securing a shaft of a cam follower device for a valve action mechanism in an automobile engine, so that the durability of the cam follower device is improved, and that the shaft is reliably secured.

2. Description of the Prior Art

Many different types of engines are used in automobiles, but all reciprocating piston type engines, with the exception of some types of two-cycle engines, are provided with intake valves and exhaust valves which open and close in synchronization with the rotation of a crankshaft.

There are many possible configurations for a valve action mechanism for driving the intake valves and the exhaust valves. For example, referring to FIG. 20 which illustrates an SOHC type mechanism, in the case of a four cycle engine, an intake valve 4 and an exhaust valve 5 are reciprocatingly driven through a pair of rocker arms 3, by means of a single cam shaft 2 which rotates at one-half the speed of a crank shaft 1. A pair of cams 6, secured to the cam shaft 2 which rotates in synchronism with the crank shaft 1, drive the intake valve 4 and the exhaust valve 5 reciprocatingly while sliding over one end of the rocker arms 3. It will be understood that the rocker arms 3 receive the movement of the cam 6.

However, in recent years, a cam follower or the like has been provided on the parts of the rocker arms 3 opposite the cams 6, rotating in response to the rotation of the cams 6 to reduce the frictional force between the peripheral surfaces of the cams 6 and the opposing parts of the rocker arms 3, and to reduce the fuel consumption and the like during the operation of the engine.

Specifically, as shown in FIG. 21 and FIG. 22, the opposite ends of a shaft 8 are securely supported in a pair of separated support walls 7 each provided at the end of the rocker arm 3 closer to the cam 6. Specifically, the shaft 8 extends through a pair of through-holes 11 in alignment formed in the support walls 7. At the periphery of the shaft 8 a short, cylindrical rotary member 10 is provided with a plurality of rollers 9 between the shaft 8 and the rotary member 10. The outer peripheral surface of the rotary member 10 contacts the outer peripheral surface of the cam 6 so that the rotary member 10 rotates around the shaft 8 following the rotation of cam 6.

The rotary member 10 converts the sliding friction between the cam 6 and the member opposed to the cam 6, specifically the opposing part of the rocker arm 3, to rolling friction so that the fuel consumption is reduced.

However, as will now be explained there are still problems with this type of cam follower device for a valve action mechanism for an engine, which must be eliminated.

Specifically, in order to operate the cam follower device stably over a long period, the shaft 8 which supports the rotary member 10 must be positively secured so that it does not rotate e.g. relative to the part of the rocker arm 3 opposed to the cam 6.

As the shaft 8 rotates with respect to the abovementioned part, wear gradually occurs at the peripheral surface of the ends of the shaft 8, and at the inner peripheral surfaces of the pair of through-holes 11 formed in the support walls 7 at the end of the rocker arm 3, respectively, so that the shaft 8 is not completely supported due to the wear, and the rotary member 10 tends to lose tight-fitting in the rotation of the cam 6.

For this reason, conventionally, as shown in FIG. 22, the opposite ends of the shaft 8 are interposed in an interference fit relationship in the through-holes 11, and in addition, a tool member, as shown in FIG. 23 and FIG. 24, is used in order that both ends of the shaft 8 are attached by caulking or crimping at the inner peripheral surfaces of the through-holes 11 so that the shaft 8 is not rotated relative to the support walls 7.

However, when rotation is prevented by using this type of simple caulking or crimping, there is concern that the shaft 8 will turn when a large force is added to the shaft 8 because the rotation of the shaft 8 in the support walls 7 is prevented only by the force of friction on the caulked or crimped portion.

In addition, when the shaft 8 is prevented from turning by caulking or crimping the both ends of the shaft 8, it is necessary that the depth of the caulking or crimping be strictly controlled. If the depth of the caulking or crimping is inadequate the shaft 8 is not properly prevented from turning, and, conversely, when the depth of the caulking or crimping is too great, the outer periphery of the mid portion of the shaft 8, where the rollers 9 contact, are deformed so as to decrease the durability of the rollers 9. Such problems are experienced in a conventional tool member for securing a shaft of a cam follower device as shown in FIG. 23 and FIG. 24, specifically when the conventional tool member is used, the force which acts against the tool member gradually increases during the caulking or crimping operation, so that it becomes difficult to strictly control the depth of the caulking or crimping.

In existing automobile engines, the force applied is not strong enough to rotate the shaft 8, but in recent years high rotation and high output engines have been provided, and there is also a tendency toward increased power application to the shaft 8. Therefore, to cope with the higher rotational speeds and higher outputs expected in the future, measures are required to more reliably prevent the rotation of the shaft 8.

As a means of eliminating this type of problem, in Japanese Utility Model First Publication No. 64-34406, as shown in FIG. 25 to 28, it has been proposed that the shaft 8 be prevented from rotating by caulking or crimping the end of the shaft 8 in the shape of a nonconcentric circle relative to the shaft 8. However, with this type of conventional structure, the caulking or crimping must be deep to actually prevent the rotation, and because it is not easy to caulk or crimp the end of the shaft 8, not only is the cost of fabricating the cam follower high, but there is a tendency for the center portion of the shaft 8 being deformed by the effect of the caulking or crimping. When the center portion of the shaft 8 is deformed by the caulking or crimping, the life of the roller bearing, in which the outer peripheral surface of the shaft 8 is used as an outer track, is undesirably shortened.

Also, in Japanese Utility Model First Publication No. 63-133851 a method is disclosed wherein only one part of the end surface of the shaft 8 is caulked or crimped at the edge of the opening of the through-hole 11 using the previously described technique, but the same type of problems are produced.

SUMMARY OF THE INVENTION

An object of the present invention is to provide, with due consideration to the drawbacks of such conventional methods and apparatus, a method and apparatus for securing a shaft of a cam follower device for a valve action mechanism in an automobile engine, so that the durability of the cam follower device is improved, and that the shaft is reliably secured.

Another object of the present invention is to provide a tool member for a method and apparatus for securing a shaft of a cam follower device for a valve action mechanism in an automobile engine to improve the durability of the secured sections of the shaft in the cam follower device.

These objects of the present invention are achieved by providing of a method of securing a shaft of a cam follower device for a valve action mechanism, wherein, after both ends of the shaft are engaged in an interference relationship in the through-holes which are formed in alignment in a pair of separated support walls provided opposing the cam to receive the action of a cam, the diameter at both ends of the shaft is expanded and the opposite ends of the shaft are caulked or crimped at the inner peripheral surface of the through-holes, and then both ends of the shaft are further expanded throughout the entire periphery thereof and inset or wedged into the inner peripheral surface of the through-holes.

These objects of the present invention are achieved by providing of a pressure means to press onto the end surface of a shaft a tool member having a main section, on the end surface of which an annular or ring-shaped projection with a V-shaped cross section is formed, the projection having an annular leading edge the diameter of which is slightly smaller than the outer diameter of the shaft, a first inclined conical surface formed on the outer peripheral side of the projection, inclined at a comparatively gentle angle with respect to the center axis of the main section; and a second inclined conical surface formed on the radially outside of the first inclined conical surface inclined at a comparatively sharp angle with respect to the center axis of the main section.

BRIEF DESCRIPTION OF THE DRAWINGS

FIG. 25 is a plan view of an example of the rotary member, shaft and part of the rocker arm to show the end of the shaft caulked or crimped in the shape of a non-concentric circle relative to the shaft;

FIG. 26 is a plan view of another example of the rotary member, shaft and part of the rocker arm to show the end of the shaft caulked or crimped in the shape of a non-concentric circle relative to the shaft;

FIG. 27 is a plan view of another example of the rotary member, shaft and part of the rocker arm to show the end of the shaft caulked or crimped in the shape of a non-concentric circle relative to the shaft;

FIG. 28 is a plan view of another example of the rotary member, shaft and part of the rocker arm to show the end of the shaft caulked or crimped in the shape of a non-concentric circle relative to the shaft:

PREFERRED EMBODIMENTS

Figure 1:
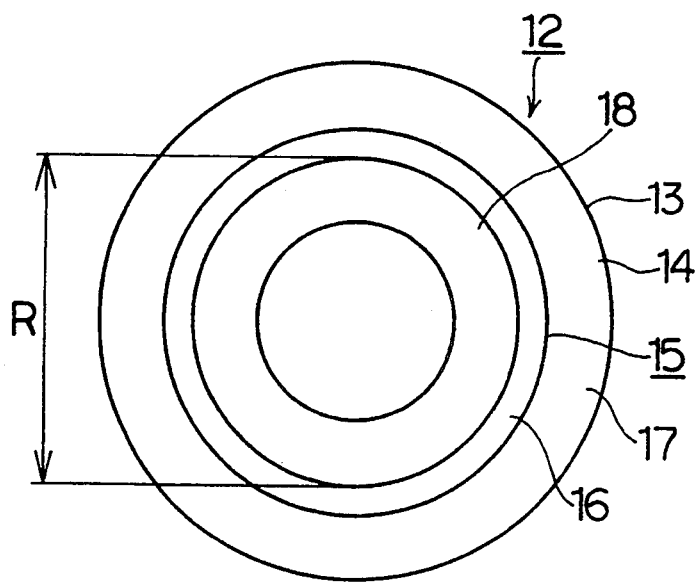
FIG. 1 is an end view of a tool member of the securing apparatus in the present invention.
Figure 2:
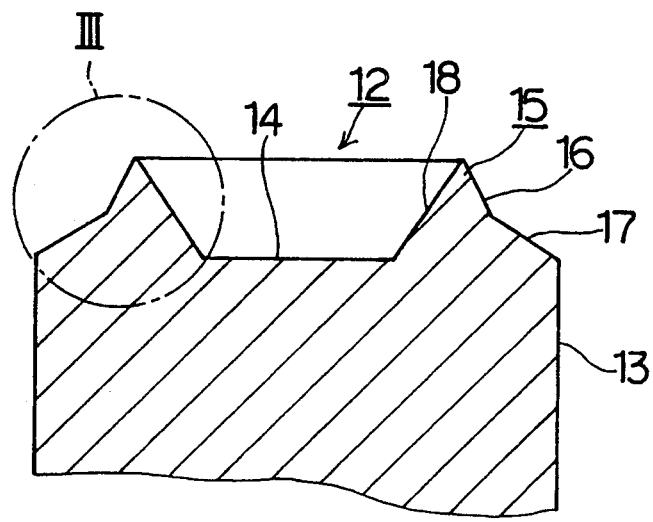
FIG. 2 is a cross-sectional view of a part of the tool member of FIG. 1.
Figure 3:
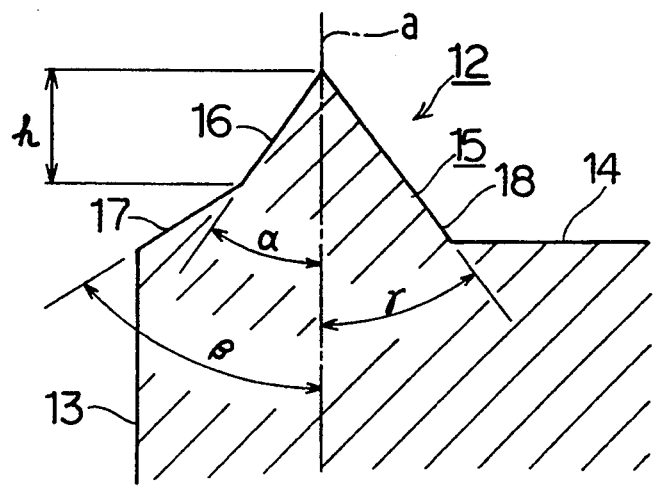
FIG. 3 is an enlarged view of the section III in FIG. 2.
Figure 4:
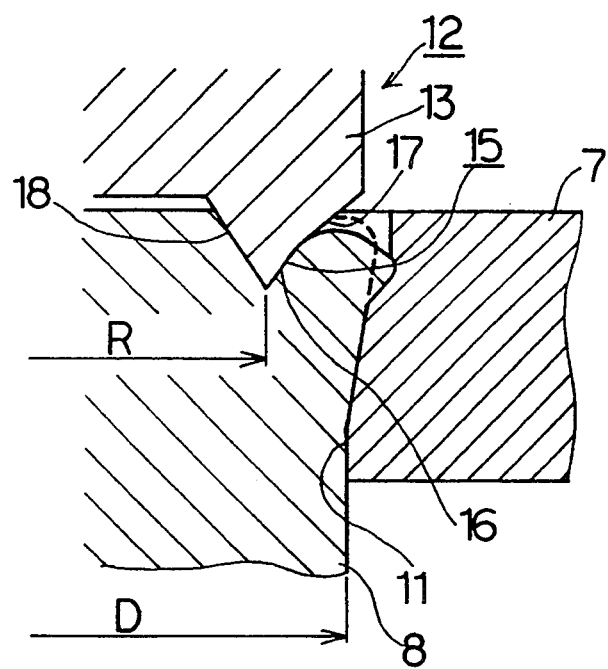
FIG. 4 is a cross-sectional view showing the parts of a shaft and a support wall to which the tool member (partly illustrated) of the subject invention is applied to secure a shaft.

These and other features of this invention will become apparent in the course of the following description of preferred embodiments which are given for illustration of the invention and not intended to limit the scope of the present invention.

The present invention is directed to a method and apparatus for securing a shaft of a cam follower device incorporated into a valve action mechanism in an automobile engine, so that the durability of the cam follower device is improved and that the shaft is reliably secured.

In the same manner as a conventional cam follower device, the cam follower device, which contacts the outer peripheral surface of a cam secured to a cam shaft which rotates in synchronism with the crank shaft of the engine, is incorporated within the valve action mechanism of the engine, so that the cam action is transmitted to the valves which open and close the suction and exhaust openings provided in the cylinder, thereby reducing the loss of power through the valve action mechanism.

In a first feature of the present invention, a method of securing a shaft of a cam follower device for a valve action mechanism is provided such that after both ends of the shaft are engaged in an interference relationship in the through-holes which are formed in alignment in a pair of separated support walls provided opposing the cam to receive the action of a cam, the diameter at both ends of the shaft is expanded and the opposite ends of the shaft are caulked or crimped at the inner peripheral surface of the through-holes, and then both ends of the shaft are further expanded throughout the entire periphery thereof and inset or wedged into the inner peripheral surface of the through-holes.

In a second feature of the present invention, an apparatus for securing a shaft of a cam follower device for a valve action mechanism comprises a pressure means for pressing the end surface of the shaft; a tool member having a main section adapted to be secured to the pressure means; an annular or ring-shaped projection with a V-shaped cross section formed on the end surface of the main section facing the end surface of the shaft, the projection having an annular leading edge the diameter of which is slightly smaller than the outer diameter of the shaft, a first inclined conical surface formed on the outer peripheral side of the projection, inclined at a comparatively gentle angle with respect to the center axis of the main section; and a second inclined conical surface formed on the radially outside of the first inclined conical surface inclined at a comparatively sharp angle with respect to the center axis of the main section.

In the third feature of the present invention, an apparatus for securing a shaft of a cam follower device for a valve action mechanism is provided with at least one non-continuous section formed on the outer peripheral edge of the projection, specifically indented from the second inclined conical surface.

In the case where a shaft is secured by means of the method for securing a shaft of a cam follower device for a valve action mechanism of the present invention, as outlined above, the shaft is secured by caulking or crimping the opposite ends of the shaft at the inner peripheral surface of the through-holes, and then by expanding the radius of the opposite ends of the shaft.

In the assembly as mentioned above, even in the case where a strong force is applied in a direction to cause the shaft to rotate, there is no rotation of the shaft because the opposite ends of the shaft are inset or wedged into the inner peripheral surfaces of the through-holes, and the durability of the secured section of the shaft is improved. In addition, because the caulking or crimping operation is performed over two stages and the opposite ends of the shaft are caused to project outward by a large amount, it is unnecessary to provide a deep caulking or crimping even in the case where the rotation must be positively prevented.

Then, when the securing method using the apparatus for securing the shaft of the present invention is applied, it is possible by the action of simply pressing the securing apparatus against the end surface of the shaft to caulk or crimp the each end of the shaft at the inner peripheral surface of the through-holes, and then further expand the radius at both ends of the shaft.

In addition, when the securing apparatus of the present invention presses against the opposite ends of the shaft in order that the periphery of the ends of the shaft radially outer than the ring-shaped section of the tool member is expanded as the ring-shaped section is wedged or inset into the shaft, specifically when the end surface of the shaft is relatively moved from the first inclined conical surface to the second inclined conical surface, the force necessary to advance the securing apparatus by pressure suddenly increases. Accordingly, the depth of the caulking or crimping, specifically the amount that the annular projection of the tool member is inset of wedged into the end surface of the shaft, is easily controlled.

Next, a preferred embodiment of the present invention will be explained in detail, with reference to the drawings.

FIG. 1 to FIG. 4 illustrate a first embodiment of the present invention.

A cylindrical or shaft-shaped tool member 12 of a securing apparatus is formed from a material such as hardened or quenched steel or the like which is considerably harder than the end of a shaft 8 which is to be secured.

The tool member 12 has a main section 13 and is adapted to be secured to a pressure applying means such as a pressing device or the like and to be pressed against the end surface of the shaft 8.

An annular or ring-shaped projection 15 is formed on an end surface 14 of the main section 13. The projection 15, which has a V-shaped cross section, projects from the end surface 14, and the diameter R of the leading edge of the projection 15 is slightly smaller than the outer diameter D of the shaft 8 which is to be secured.

The ring-shaped projection 15 has a comparatively gently sloping first inclined conical surface 16 formed on the radially outer peripheral side of the right-shaped projection 15 at an angle $\alpha$ [alpha] with a straight line a, parallel to the center axis of the main section 13.

In addition, a comparatively sharply sloping second inclined conical surface 17 is formed at an angle $\beta$ [beta] with the straight line a, and continued to the radially outside of the first inclined conical surface 16 on the radially outer peripheral side of the projection 15. A third inclined conical surface 18 is provided on the radially inner peripheral side of the projection 15.

The cross sectional shape of the projection 15 is preferably formed to the following numerical values.

Specifically, the angle $\alpha$ [alpha] of the first inclined conical surface 16 is preferably 50 deg and the height h 0.2 mm. The preferable angle $\beta$ [beta] for the second inclined conical surface 17 is 70 deg, and an angle $\gamma$ [gamma] for the third inclined conical surface 18 is preferably 30 deg on the inner peripheral side of the projection 15.

Figure 21:
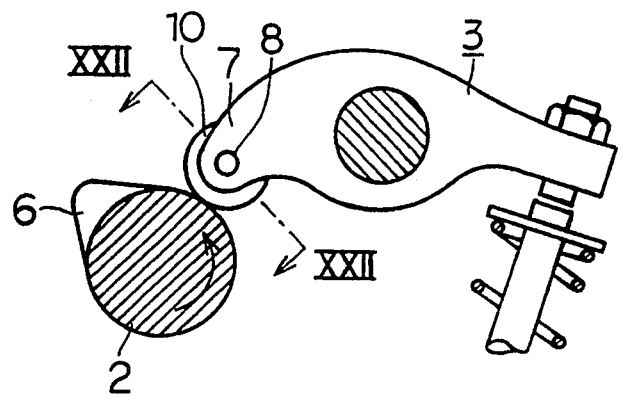
FIG. 21 is a partly cross sectional view to show a rocker arm and cam shaft assembly for transmission.
Figure 22:
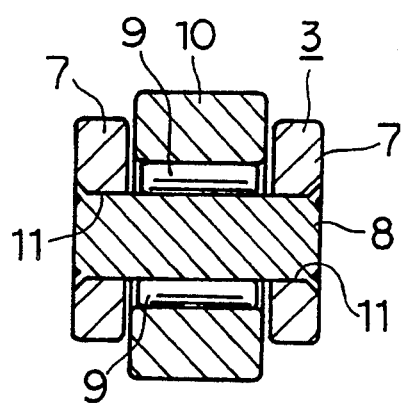
FIG. 22 is a cross-sectional view taken along the line XXII—XXII of FIG. 21 to show a rotary member and rollers incorporated therein.
Figure 23:
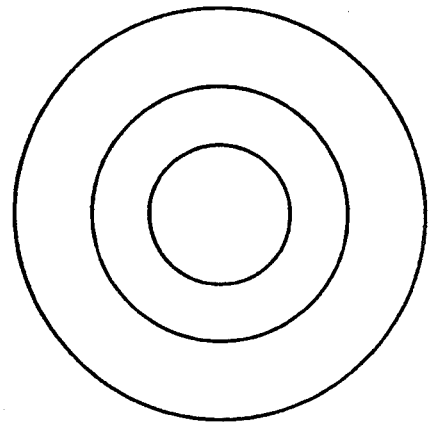
FIG. 23 is an end view of a tool member of a conventional securing apparatus.
Figure 24:
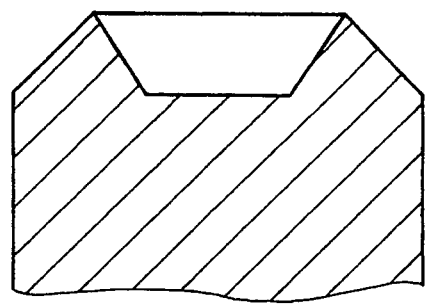
FIG. 24 is a cross-sectional view of an end portion of the tool member of FIG. 23.

A pair of parallel support walls 7 to which the tool member 12 is applied are formed with a suitable space therebetween on the end of a rocker arm 3 fabricated from an aluminum alloy or the like. Specifically, the tool member 12 is used for securing a shaft 8 to the pair of parallel support walls 7 as illustrated in FIG. 21 and FIG. 22. The shaft 8 is provided for maintaining a rotary member 10 around it.

A pair of circular through-holes 11 is provided at aligned positions in the support walls 7. The two end sections of a single shaft 8, which is formed from bearing steel or the like, are inserted into the respective through-holes 11 so that the support walls 7 support the opposite ends of the shaft 8.

The mid section of the shaft 8 provided between the support walls 7 when the shaft 8 has been secured in the support walls 7, is surface hardened by a high frequency hardening means or the like, while the opposite ends of the shaft 8 inserted into the through-holes 11 are not hardened and kept soft so that it is subject to plastic deformation. The inner diameter of one of the through-holes 11 formed in the support walls 7 to first receive the shaft 8, is slightly larger than the outer diameter of the shaft 8 prior to securing (prior to expanding the diameter of the ends) so that, when the shaft 8 is inserted into the through-hole 11, no damage occurs to the outer peripheral surface of the mid section of the shaft 8, which is desirable because the outer peripheral surface of the mid section of the shaft 8 functions as an outer track for a plurality of rollers 9. Also, so long as the opposite ends of the shaft 8 are reliably supported, the inner diameter of the other of the through-holes 11 may be larger than the outer diameter of the shaft 8 prior to securing.

After the opposite ends of the shaft 8 which supports the rotary member 10 with the rollers 9 therebetween, have been positioned in the through-holes 11 of the support walls 7, the projection 15 formed on the end surface 14 of the tool member 12 is pressed strongly against the respective end surface of the shaft 8 by activating a press machine of the securing apparatus of the present invention.

Figure 5:
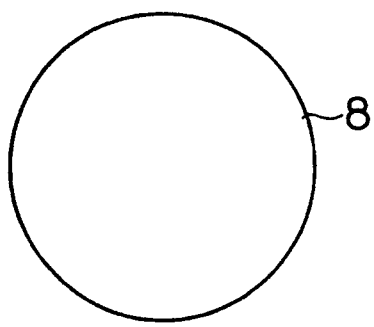
FIG. 5 is an end view of a shaft to which a securing apparatus of the present invention is to be applied.
Figure 6:
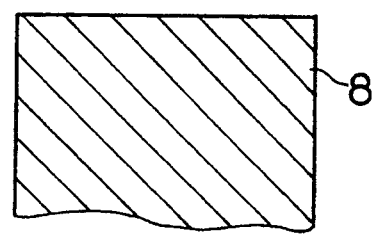
FIG. 6 is a cross-sectional view of an end portion of the shaft of FIG. 5.
Figure 7:
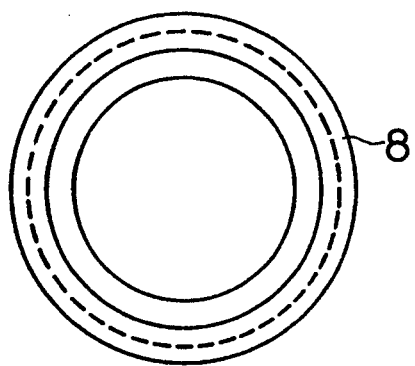
FIG. 7 is an end view of the shaft of FIG. 5 after the first application of the securing apparatus of the present invention.
Figure 8:
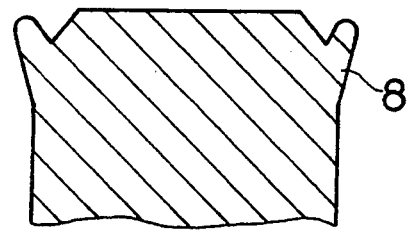
FIG. 8 is a cross-sectional view of an end portion of the shaft of FIG. 7.

As this pressure is applied, specifically as the projection 15 having the first and third conical slanted surface 16, 18 is progressively wedged or inset into the end surface of the shaft 8, the outer peripheral edge of the end surface of the shaft 8 is notched outward. Consequently, the end section of the shaft 8, which has a shape as illustrated in FIG. 5 and FIG. 6 prior to the application of pressure, is deformed as illustrated in FIG. 7 and FIG. 8, and also as illustrated by the dotted line in FIG. 4.

In implementing the securing method of the present invention, the shaft 8 is just secured by crimping the opposed ends of the shaft 8 with the first and the third slanted conical faces 16, 18 at the leading end of the projection 15. Specifically both ends of the shaft 8 are caulked or crimped at the inner peripheral surfaces of the through-holes 11. Then, the operation of the press machine on which the tool member 12 is mounted is continued so that the projection 15 of the tool member 12 is wedged or inset even further into the end surface of the shaft 8. As a result, the second slanted conical surface 17 formed on the base of the projection 15 is applied to the end surface of the shaft 8, so that the diameters at both ends of the shaft 8 are even further expanded.

Figure 9:
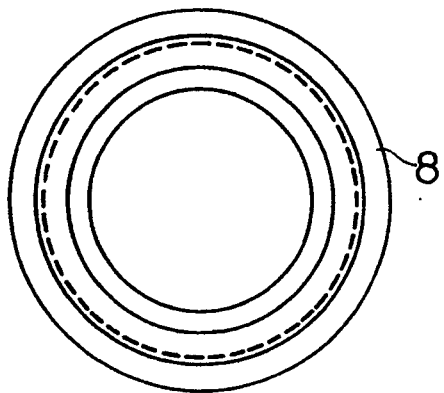
FIG. 9 is an end view of the shaft of FIG. 5 after the further application of the securing apparatus of the present invention.
Figure 10:
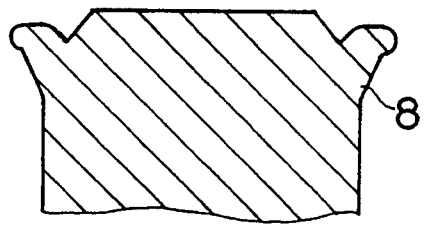
FIG. 10 is a cross-sectional view of an end portion of the shaft of FIG. 8.

Accordingly, the opposite ends of the shaft 8 are deformed as shown in FIG. 9 and FIG. 10. It will be seen that the notched annular peripheral edge of the shaft 8 is bent outward and pressed flat. Each end of the shaft 8 is firmly inset or wedged into the peripheral section of the opening of the through-holes 11, as shown by the solid line in FIG. 4. The contact pressure between each end of the shaft 8 and the peripheral section of the opening of the through-hole 11 increases so that it is difficult for the shaft 8 to rotate inside the through-holes 11 whereby the durability of the secured section of the shaft is improved.

Simultaneously, the second slanted conical surface 17, which is slanted at a sharp angle relative to the center axis, abuts the end surface of the shaft 8 so that the force used to inset the ring-shaped projection of the tool member 12 into the end surface of the shaft 8 abruptly increases. The operation of the press machine is halted as a result of this abrupt increase in pressure so that the depth of caulking or crimping of the end section of the shaft 8 is not excessive.

This series of securing operations is easily performed by merely applying pressure from the tool member 12 onto the end surface of the shaft 8 using the press machine or the like. Further, when this pressure is applied so that the end of the shaft 8 is being caulked or drimped, the caulking or crimping operation is carried out over two stages. Because the end of the shaft 8 is expanded radially outward as a result of the second stage caulking or crimping operation, the caulking or crimping can be done with a comparatively small force, so that rotation of the shaft 8 can be reliably prevented, while the leading end of the annular or ring-shape projection never goes deep in the end section of the shaft 8, providing a smaller crimping or caulking depth.

In a further embodiment where the diameter is considerably increased in the outward direction at only one portion of the opposite ends of the shaft, a stepped portion formed between that one portion and the remaining portion is engaged with the inner peripheral edge of the through-hole, so that the rotation of the shaft at the inside of the through-hole is more reliable prevented.

Figure 11:
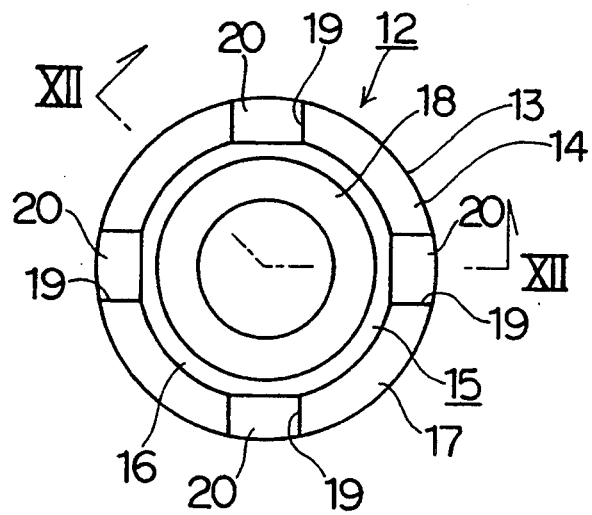
FIG. 11 is an end view of a tool member of the securing apparatus in the present invention.
Figure 12:
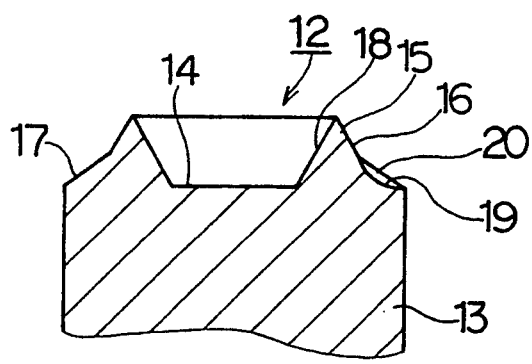
FIG. 12 is a cross-sectional view taken along the line XII—XII in FIG. 11 to show an end portion of the tool member.
Figure 13:
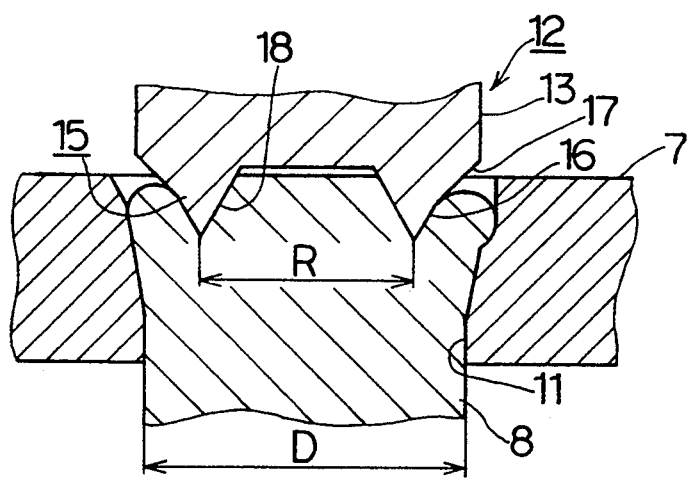
FIG. 13 is a cross-sectional view illustrating the operation of securing the shaft using a securing apparatus of the present invention.

A second embodiment of the present invention will now be explained with reference to FIGS. 11 to 13.

The tool member 12 of this embodiment also comprises the comparatively gently sloping first inclined conical surface 16 on the outer peripheral side of the annular or ring-shaped projection 15 formed on the end surface 14 of the main section 13 of the tool member 12 in the same manner as on the securing apparatus of the first embodiment, and the comparatively sharply sloping second inclined conical surface provided on the radially outer side of the first inclined conical surface 16. The inner peripheral side of the projection 15 acts as the third inclined conical surface 18.

In this embodiment a plurality of concave sections 19 is provided, each concave section 19 being indentedly formed with a more globular shape in the second inclined conical surface 17 at fourth positions on the outer peripheral edge of the projection 15. These concave sections 19 provide a plurality of non-continuous sections 20 in the second inclined conical surface 17.

In this configuration, the ends of the shaft 8 which supports the rotary section 10 (FIG. 22) with the rollers 9 therebetween are secured inside the through-holes 11 as mentioned in the first embodiment, specifically the opposite ends of the shaft 8 are inserted into the through-holes 11 in the support walls 7, then the press machine (not shown) of the tool member 12 is activated. By forcing with a strong pressure the projection 15 against the end surfaces of the shaft 8, the first and third inclined conical surfaces 16, 18 on the projection 15 are wedged or inset into the end surface of the shaft 8 so that the outer peripheral edge of the end surface of the shaft 8 is notched and expanded radially outward, and the end section of the shaft 8, originally shaped as illustrated in FIG. 5 and FIG. 6, is deformed as illustrated in FIG. 7 and FIG. 8.

From this state, the operation of the press machine of the securing apparatus is further continued so that the annular projection 15 on the tool member 12 is even further advanced to the end surface of the shaft 8 and the second slanted conical surface 17 formed at the base of the projection 15 is applied to the end surface of the shaft 8, so that the diameters at both ends of the shaft 8 are even further expanded.

Figure 14:
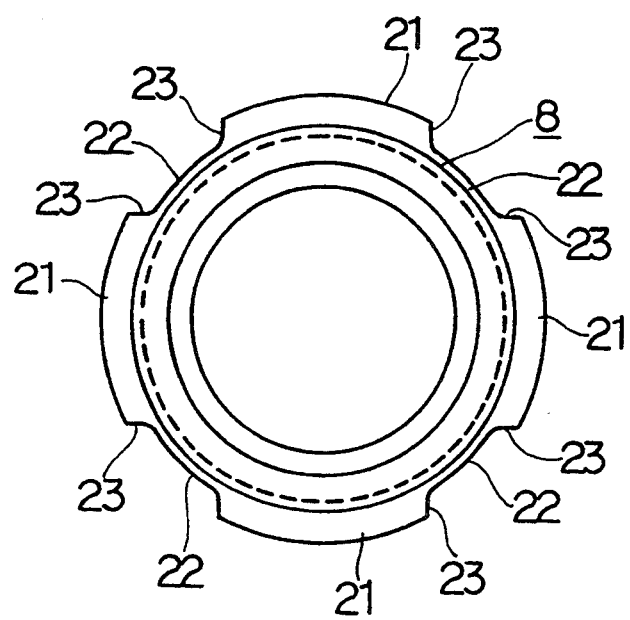
FIG. 14 is an end view of a shaft the end portion of which is deformed by the application of the tool member of FIG. 12.
Figure 15:
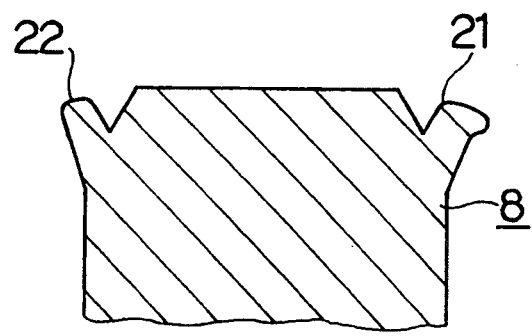
FIG. 15 is a cross-sectional view of an end portion of the shaft of FIG. 14.

Because the non-continuous sections 20 are provided at four locations on the second slanted conical surface 17, in this embodiment, the diameter is not expanded at part of the periphery of the projection, so that the end surface of the shaft 8 is deformed as illustrated in FIG. 14 and FIG. 15 after the second slanted conical surface 17 is applied to that end surface of the shaft 8.

Specifically, a plurality of sections 21 is further expanded outwardly by the second slanted conical surface 17 (see the edge section 21 of FIG. 5); while no deformation from the state shown in FIG. 7 and FIG. 8 occurs in a plurality of sections 22 opposed to the non-continuous sections 20 (see the edge section 22 of FIG. 5), so that a plurality of stepped portion 23 are formed between the edge sections 21 and 22. Since the stepped portion 23 are engaged with the edges of the opening of the through-hole 11, the shaft 8 with the stepped portion 23 formed is reliably prevented from rotating, so that the durability of the secured section of the shaft is improved.

Figure 16:
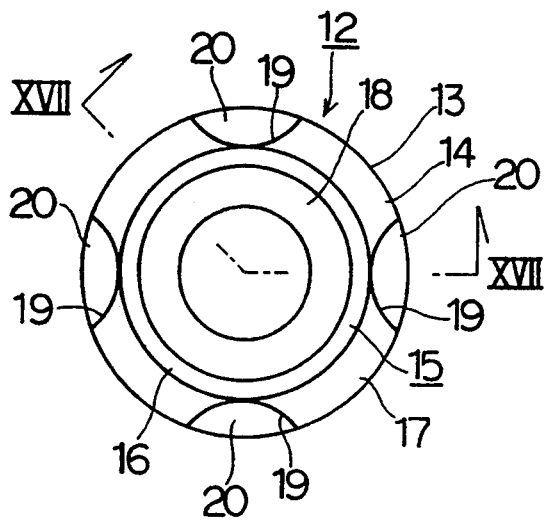
FIG. 16 is an end view of a tool member of the securing apparatus in the present invention.
Figure 17:
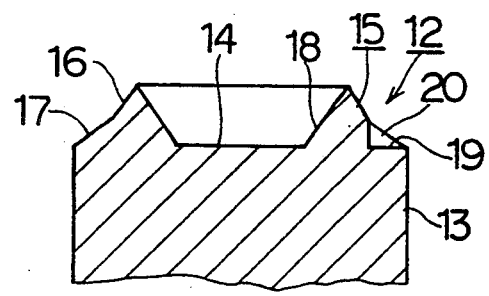
FIG. 17 is a cross-sectional view taken along the line XVII—XVII in FIG. 16 to show an end portion of the tool member.
Figure 18:
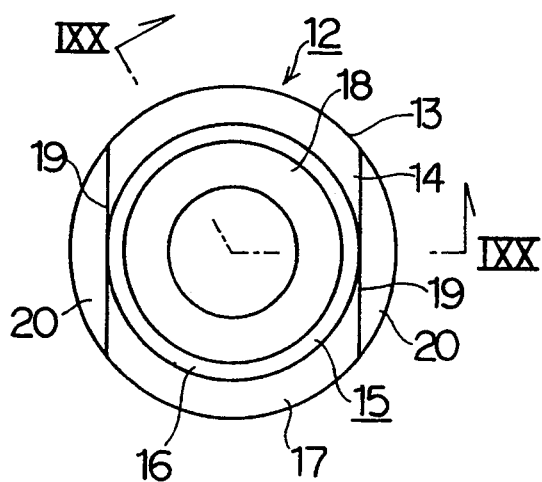
FIG. 18 is an end view of a tool member of the securing apparatus in the present invention.
Figure 19:
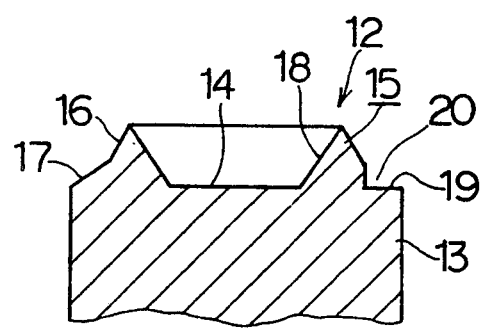
FIG. 19 is a cross-sectional elevational view taken along the line IXX—IXX in FIG. 18 to show an end portion of the tool member.
Figure 20:
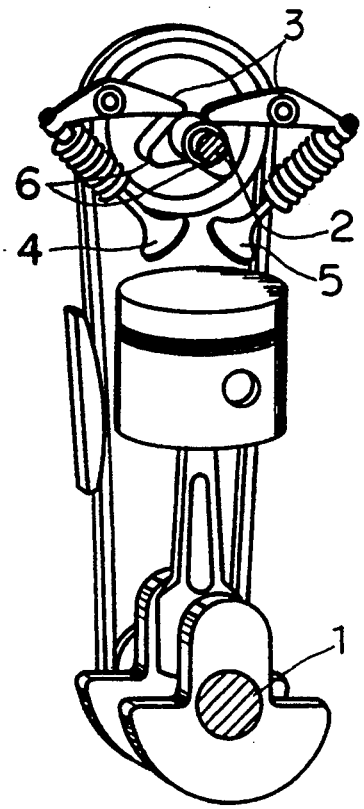
FIG. 20 is a schematic view of a SOHC type mechanism of a four cycle engine.

Next, a third embodiment of the shaft securing apparatus of the present invention is shown in FIG. 16 and FIG. 17, while a fourth embodiment is shown in FIG. 18 and FIG. 19.

In the third embodiment shown in FIG. 16 and FIG. 17, the concave sections 19 for forming the non-continuous sections 20 in the second inclined conical surface 17 are formed in a notched arc shape so that the concave sections 19 are deepened.

Also, in the fourth embodiment shown in FIG. 18 and FIG. 19, the concave sections 19 are formed by cutting out the end surfaces 14 at two parallel positions.

The operation of the third and fourth embodiments of the securing apparatus is almost identical to the operation of the securing apparatus of the second embodiment.

In summary because of the method and apparatus for securing the shaft of a cam follower device for an engine valve action mechanism, as described in the foregoing explanation, the sound or noise created by running the engine is reduced and there is also a reduction in fuel consumption. Also, when the engine is operated at higher speeds and enlarged for higher outputs high durability of the cam follower device can be maintained. This invention plays a major role in reducing the sound or noise from a high output engine and reducing the fuel costs.

Further, a comparatively simple caulking or crimping device for the securing apparatus can be fabricated and the depth of caulking or crimping kept small, so that the caulking depth is never excessive, therefore a stable cam follower device with superior durability can be provided at a lower cost.

What is claimed is:

1. A method of assembling a cam follower device which includes a pair of parallel support walls having mount through-holes in alignment with each other, a shaft having opposite end sections each having an end face, the end sections being fitted respectively into the mount through-holes of the support walls, and a middle section positioned axially between the end sections of the shaft, an annular rotary member provided around the middle section of the shaft, and a plurality of rollers provided between the shaft and the annular rotary member, the method comprising the steps of:
providing a cylindrical tool member to be pressed against said shaft and which has an annular projection with a double-tapered outer face having a first outer surface tapered to form a leading edge so that a wedging action is caused as the leading edge is pressed into one of the end sections through the end face of the shaft and a second outer surface tapered in respect to said first outer surface so as to produce a relatively larger resistance to the wedging action; and
pressing the tool member against the end face of the end section of the shaft so that the leading edge of the tool member is advanced into the end section of the shaft to crimp the end section of the shaft against a support wall around a respective mount through-hole in such a manner that resistance to the wedging action is suddenly increased by abutting of the second outer surface of the tool member against the end section of the shaft whereby the leading edge is prevented from advancing too deep to affect the middle section of the shaft.

2. A method of assembling a cam follower device of claim 1, wherein the end sections of the shaft each have an edge to define the end face, and the end sections of the shaft are crimped in a two-step manner generally along the edge so that during said pressing step the edge of the shaft is expanded in diameter generally along the edge of said end section and is pressed onto said support wall.

3. A method of assembling a cam follower device of claim 1, wherein the end sections of the shaft have an edge to define the end face, and the end sections of the shaft are crimped, so that the edge of the shaft is crimped generally along the edge, and the second outer surface is formed partly around the first outer surface, so that the second outer surface is partly abutted to the end section of the shaft, whereby the shaft is prevented from rotating in the through-holes.

4. A method of assembling a cam follower device of claim 1, wherein the shaft is first secured in engaging relationship in the mount through-holes, and the shaft is then secured by crimping the opposite ends of the support walls, so that even in the case where a strong force is applied in a direction to cause the shaft to rotate, the shaft is prevented from rotating.

* * * * *